US008475037B2

(12) United States Patent
Takigawa et al.

(10) Patent No.: US 8,475,037 B2
(45) Date of Patent: Jul. 2, 2013

(54) MOVING OBJECT THERMOMETER (75) Inventors: Katsunobu Takigawa, Tokyo (JP); Yasufumi Sakamoto, Tokyo (JP)

(73) Assignee: Takikawa Engineering Co., Ltd., Tokyo (JP)

( * ) Notice: Subject to any disclaimer, the term of this patent is extended or adjusted under 35 U.S.C. 154(b) by 305 days.

(21) Appl. No.: 12/898,000

(22) Filed: Oct. 5, 2010

(65) Prior Publication Data
US 2011/0080934 A1   Apr. 7, 2011

(30) Foreign Application Priority Data

Oct. 6, 2009  (JP) .................................. 2009-232395

(51) Int. Cl.
G01K 1/14 (2006.01)
G01K 13/08 (2006.01)
G01K 7/02 (2006.01)

(52) U.S. Cl.
USPC ............................. 374/153; 374/179; 136/200

(58) Field of Classification Search
USPC .................. 374/153, 141, 208, 179; 136/200
See application file for complete search history.

(56) References Cited

U.S. PATENT DOCUMENTS

| 2,627,182 | A | * | 2/1953 | Quereau et al. | 374/135 |
| 4,343,961 | A | * | 8/1982 | Norton | 136/230 |
| 4,419,023 | A | * | 12/1983 | Hager, Jr. | 374/179 |
| 4,441,827 | A | * | 4/1984 | Coderre | 374/153 |
| 4,444,990 | A | * | 4/1984 | Villar | 136/221 |
| 4,549,162 | A | * | 10/1985 | Grimm | 338/28 |
| 4,561,306 | A | * | 12/1985 | Marino et al. | 73/866.5 |
| 4,575,505 | A | * | 3/1986 | Jonas et al. | 514/248 |
| 4,907,894 | A | * | 3/1990 | Guyoncourt | 374/120 |
| 6,074,088 | A | * | 6/2000 | Oberschmid et al. | 374/153 |
| 7,018,105 | B2 | * | 3/2006 | Oka | 384/448 |
| 8,004,423 | B2 | * | 8/2011 | Mitchell et al. | 340/870.17 |
| 8,229,646 | B2 | * | 7/2012 | Kulczyk et al. | 701/100 |

FOREIGN PATENT DOCUMENTS

| JP | 07-072021 | 3/1995 |
| JP | 10-144452 | 5/1998 |
| JP | 10-318854 | 12/1998 |
| JP | 2003-083817 | 3/2003 |

OTHER PUBLICATIONS

Patent Abstracts of Japan Publication No. 07-072021 published Mar. 17, 1995.

(Continued)

Primary Examiner — Gail Verbitsky
(74) Attorney, Agent, or Firm — Ladas & Parry LLP (57) ABSTRACT A moving object thermometer is provided which can precisely measure the surface temperature of a moving (travelling) measurement object, particularly, a small-diameter conductive wire. A first metallic wire 1 and a second metallic wire 2 constituting a thermocouple are disposed on the outer circumferential surface 13 of the disk 11 in the rotary section 10 so as to be inclined toward the shaft center. A thermoelectric force resulting from contact of the metallic wires with a measurement object is converted into an electric signal, which is transmitted through the light emitting diode 31 and passed to the photodiode 32 provided at the stationary section 20 in a non-contact manner. Application of a high frequency current to the stationary side coil 42 provided at the stationary section 20 causes electric power to be supplied in a non-contact manner to the rotary side coil 41 provided so as to be opposed to the stationary side coil 42.

8 Claims, 4 Drawing Sheets

OTHER PUBLICATIONS

Patent Abstracts of Japan Publication No. 10-144452 published May 28, 1998.
Patent Abstracts of Japan Publication No. 10-318854 published Dec. 4, 1998.
Patent Abstracts of Japan Publication No. 2003-083817 published Mar. 19, 2003.

* cited by examiner

MOVING OBJECT THERMOMETER

BACKGROUND OF THE INVENTION

1. Field of the Invention

The present invention relates to a moving object thermometer and, more particularly, to a moving object thermometer for measuring the surface temperature of a travelling or rotating metallic body (such as a metallic wire).

2. Description of the Related Arts

Conventionally, moving object thermometers for measuring the surface temperature of a travelling or rotating conductive body such as a metallic body are disclosed in, for example, Patent Document 1 in which a pair of conductive rotary rollers, each rotatably supported by a sliding bearing, are integrated into one unit with an insulator therebetween and are wrapped at its outer circumferential surface with a thermocouple dissimilar metal, thereby causing the outer circumferential surface of the rotary roller to contact with the travelling (rotating) measurement object in order to generate a thermoelectric force in the dissimilar metal, which is inputted to an electronic automatic equilibrium measuring instrument via the sliding bearing. Also, a thermometer is disclosed in, for example, Patent Document 2 in which a pair of dissimilar metallic wires constituting a thermocouple are slightly spaced and stretched in the shape of "X", and the tip of a soldering iron is brought into contact with the pair of dissimilar metallic wires in such a manner that the tip straddles them, thereby measuring the temperature of the soldering iron tip. Furthermore, a contact-type thermometer is disclosed in, for example, Patent Document 3 or 4 which includes a contact plate that slides on a travelling sheet-like measurement object, a circular elastic member for pressing the contact plate against the measurement object, and a thermocouple provided between the contact plate and the circular elastic member.

PRIOR ARTS

Patent Documents

Patent Document 1: Japanese Unexamined Patent Application Publication No. 7-72021 (FIG. 2 on pages 3 through 4).

Patent Document 2: Japanese Unexamined Patent Application Publication No. 10-144452 (FIG. 2 on pages 4 through 5).

Patent Document 3: Japanese Unexamined Patent Application Publications No. 10-318854 (FIG. 5 on pages 4 through 5).

Patent Document 4: Japanese Unexamined Patent Application Publications No. 2003-83817 (FIG. 7 on pages 4 through 6).

SUMMARY OF THE INVENTION

Problem to be Solved (a) However, the invention disclosed in Japanese Unexamined Patent Application Publication No. 7-72021 leads to a problem that it is difficult to measure the surface temperature of, particularly, a small-diameter metallic wire that is moving (or travelling). In other words, in order to measure the surface temperature of a small-diameter metallic wire, an insulating material placed between a pair of dissimilar metals must be made thinner than the metallic wire, thereby approximating the pair of dissimilar metals. Consequently, difficulties in guiding a travelling metallic wire to an exact position have been encountered or a short-circuit failure caused by metallic powder falling on the approximated dissimilar metals (same as a conductive rotary roller) have been experienced.

(b) Also, when temperature measurement is intermittently made or intermittent temperature measurement results, such intermittent temperature measurement tends to suffer from a noise in a non-temperature-measurement mode, deteriorating the temperature measurement accuracy. Particularly, in an environment of frequently opened usage, temperature cannot be precisely measured.

(c) The conductive rotary roller is formed of a conductive material such as a metal and relatively heavy. For this reason, a sliding between the dissimilar metals and the travelling measurement object causes frictional heat generation in the measurement object, resulting in a measurement error.

(d) Also, the conductive rotary roller deprives a measurement object (for example, a small-diameter metallic wire) of heat due to its large thermal capacity, which causes deterioration in temperature measurement accuracy (or causes a measurement error).

(e) Furthermore, since a thermoelectric force generated in the dissimilar metals is transmitted through a contact between the outer circumference of the rotary shaft of the rotary roller and the inner circumference of the sliding bearing, a possible unstable contact may cause an incorrect transmission of the thermoelectric force. If a brush is pressed against the rotary shaft to ensure the contact (or a slip-ring mechanism is employed), the rotational resistance (friction) of the rotary roller increases. As a result, a sliding contact between the dissimilar metals and the travelling measurement object increases, resulting in an excessive force exerted on the measurement object or friction powder arising from the dissimilar metals or the measurement object.

(f) On the other hand, the invention disclosed in Japanese Unexamined Patent Application Publication No. 10-144452 has a disadvantage in that since a pair of dissimilar metallic wires are stationary, they cannot be used to measure the temperature of a measurement object. In other words, a sliding contact between the pair of dissimilar metallic wires and the travelling measurement object causes the dissimilar metallic wires to wear, resulting in a fracture or deteriorated measurement accuracy due to frictional heat.

(g) Also, in order to measure the surface temperature of, particularly, a travelling small-diameter metallic wire, the pair of dissimilar metallic wires stretched in the shape of "X" must be short-circuited with a metallic wire. However, it is difficult to exactly guide the metallic wire to such a location.

(h) Furthermore, the invention disclosed in Japanese Unexamined Patent Application Publication No. 10-318854 or No. 2003-83817 results in a worn (occurrence of friction powder) or fractured measurement object and deteriorated measurement accuracy due to frictional heat, since a contact plate is pressed against the measurement object while sliding on it. Also, the contact plate durability has been found to be degraded. In addition, in this invention, the measurement object slides on one surface (sliding surface) of the contact plate, while the thermocouple contacts with the other surface (measurement surface) of the contact plate. For this reason, when the temperature of a sheet-like measurement object is measured, the entire surface of the sliding surface is subjected to heat from the measurement object. However, when the temperature of a thin-wire-like (small diameter) measurement object is measured, only one portion of the sliding surface is subjected to heat from the measurement object. Accordingly, if there is a change in the distance between the sliding position of the thin-wire-like measurement object and the thermocouple, deterioration in measurement accuracy will result.

The present invention has been achieved in light of the foregoing and a first object thereof is to enable measurement of the surface temperature of a moving (travelling) measurement object, particularly, a small-diameter conductive wire. Another object of the present invention is to measure the surface temperature of a measurement object with precision.

Means for Solving the Problem (1) A moving object thermometer according to the present invention includes a rotary section and a stationary section that rotatably supports the rotary section, wherein the rotary section has a disk formed of an insulating material, and a first metallic wire and a second metallic wire both of which constitute a thermocouple, and wherein portions of the first metallic wire and the second metallic wire are disposed side by side on the outer circumferential surface of the disk so as to be inclined toward the shaft center of the disk.

(2) A portion of the first metallic wire is disposed in a zig-zag manner on the outer circumferential surface of the disk in such a manner that it runs from one end face to the other end face of the disk and at the same time runs from the other end face to the one end face, and the portion of the second metallic wire is disposed in a zig-zag manner on the outer circumferential surface of the disk so as to run side by side with the portion of the first metallic wire.

(3) A plurality of through-holes communicating one end face with the other end face of the disk are provided along the outer circumferential surface of the disk, and a portion of the first metallic wire is disposed on the outer circumferential surface of the disk so as to run from a one end face of the disk to the other end face and at the same time run through the through-holes from the other end face to the one end face, and the portion of the second metallic wire is disposed by side with a portion of the first metallic wire on the outer circumferential surface of the disk so as to run from one end face to the other end face of the disk and at the same time run through the through-holes from the other end face to the one end face.

(4) An end of the first metallic wire and an end of the second metallic wire are short-circuited with each other.

(5) A temperature measurement circuit connected to the first metallic wire and the second metallic wire and a signal sending circuit connected to the temperature measurement circuit are mounted on the disk of the rotary section, and signal sending means connected to the signal sending circuit is provided at the shaft center of the disk, and signal receiving means is mounted on the stationary section so as to be opposed to and spaced at a predetermined distance from the signal sending means, and, when a measurement object contacts with the first metallic wire and the second metallic wire, a thermoelectric force generated in the first metallic wire and the second metallic wire is measured by the temperature measurement circuit and thus measured thermoelectric force is converted by the signal sending circuit into a sending signal, which is passed from the signal sending means to the signal receiving means.

(6) In item (4) above, the temperature measurement circuit connected to the first metallic wire and the second metallic wire for measuring the temperature on the basis of an thermoelectric force generated in the first metallic wire and the second metallic wire is mounted in the disk of the rotary section, and, when T is a temperature measured by the temperature measurement circuit when a measurement object contacts with the first metallic wire and the second metallic wire and T1 is a temperature measured by the temperature measurement circuit when the measurement object is not in contact with the first metallic wire and the second metallic wire, temperature T2 of the measurement object is compensated by a following equation:

$$T2 = (T \cdot (\lambda 2 + \lambda 1) - T1 \cdot \lambda 1)/\lambda 2, \text{ where}$$

$\lambda 1$ is the average of thermal conductivities of the first metallic wire and the second metallic wire, and $\lambda 2$ is the thermal conductivity of the measurement object.

(7) Also, in item (6) above, signal sending means connected to the temperature measurement circuit is provided at the shaft center of the disk in the rotary section, and signal receiving means is mounted in the stationary section so as to be opposed to and spaced at a predetermined distance from the signal sending means, and the signal sending means sends either of the measured temperatures T and T1 or the compensated temperature T2 to the signal receiving means.

(8) Furthermore, in any one of items (1) through (7) above, a high frequency sending circuit and a stationary side coil connected to the high frequency sending circuit are provided in the stationary section, and a rotary side coil is provided in the rotary section so as to be opposed to and spaced at a predetermined distance from the stationary side coil, and application of a high frequency current to the stationary side coil causes electric power to be supplied to the rotary side coil in a non-contact manner.

Advantages of the Invention (i) A moving object thermometer according to the present invention has portions of a first metallic wire and a second metallic wire (hereinafter the both may be collectively referred to as "metallic wire") disposed on the outer circumferential surface of a disk so as to be inclined toward the shaft center of the disk. For this reason, when a measurement object that is travelling and conductive contacts with the disk, the disk rotates, and resultant contact of the measurement object with the first metallic wire and the second metallic wire causes the first metallic wire and the second metallic wire to be short-circuited with each other, thereby allowing measurement of the surface temperature of the narrowest (thinnest) measurement object (or that having the smallest conductor diameter). Since it is not necessary to make the distance between the first metallic wire and the second metallic wire smaller than the width of the measurement object (conductor diameter), no short-circuit failure will result even if metallic powder or the like is present. Also, the first metallic wire and the second metallic wire can be disposed on the outer circumferential surface of the disk over a wide area ranging from one end face to the other end face, thereby allowing measurement in such a wide area, which enables a moving measurement object to be easily guided (it can be achieved by just providing flanges along both end faces of the disk, for example, by just using a V-shaped pulley-like disk having a flat bottom). Furthermore, the disk is formed of an insulating material, but no limitations are placed on the material, thereby attaining a reduction in weight and thermal capacity, which allows the disk to easily rotate as well as achieves lighter sliding between the metallic wires and the measurement object. Accordingly, use of thinner metallic wires can be implemented, which results in reduction in thermal capacity and frictional heat and prevention of wear and metallic powder generation, leading to enhanced measurement accuracy and prolonged durability of the equipment.

(ii) Also, the moving object thermometer according to the present invention has portions of the first metallic wire and the second metallic wire disposed side by side in a zig-zag manner on the outer circumferential surface of the disk. Accordingly, when a measurement object (conductive wire or the like) that is travelling and conductive abuts on the disk (more precisely, portions of the first metallic wire and the second metallic wire), the disk rotates, causing the surface temperature of the measurement objet to be measured several times during one rotation of the disk. In other words, it allows more frequent (or at shorter measurement intervals) measurement of the lengthwise temperature distribution of the measurement object (conductive wire or the like).

(iii) In addition, the first metallic wire and the second metallic wire are disposed in an overcast state on the outer circumferential surface of the disk so as to run through the through-holes, which allows the metallic wires to be precisely disposed. This arrangement also allows the portions of the first metallic wire and adjacent portions of the second metallic wire to be easily approximated, which ensures that the metallic wires are short-circuited with each other (formation of a thermocouple) and increases the number of measurements during one rotation of the disk.

(iv) In addition, the ends of the first metallic wire and the second metallic wire are short-circuited with each other, which ensures immunity from noises regardless of the presence of intermittent short-circuit events caused by the measurement object, eliminating the possibility of deteriorated measurement accuracy.

(v) Furthermore, a thermoelectric force generated in the metallic wires is converted into a sending signal and transmitted in a non-contact manner (for example, not via a slip ring) from the rotary section to the stationary section, causing no rotational resistance (friction) associated with the transmission. Accordingly, lighter sliding between the metallic wires and the measurement object can be attained, which ensures that the use of thinner metallic wires is implemented. This results in reduction in thermal capacity and minimization of frictional heat, wear, and metallic powder generation, leading to further enhanced measurement accuracy and prolonged durability of the equipment.

(vi) Temperature T2 of the measurement object is compensated by using the following equation (hereinafter referred to as "Equation 1").

$$T2 = (T \cdot (\lambda 2 + \lambda 1) - T1 \cdot \lambda 1)/\lambda 2 \quad \text{Equation 1}$$

T: Temperature measured by the temperature measurement circuit when the measurement object contacts with the metallic wires T1: Temperature measured by the temperature measurement circuit when the measurement object is not in contact with the metallic wires (that is, the ends of both metallic wires are short-circuited with each other)

λ1: Average of thermal conductivities of the first metallic wire and the second metallic wire.

λ2: Thermal conductivity of the measurement object

Accordingly, even if the duration of contact between the metallic wires and the measurement object is short and they become out of contact with one another before the temperature of the metallic wires reaches the surface temperature of the measurement object, the surface temperature of the measurement object can be precisely determined.

(vii) Also, signal sending means is provided in the rotary section, while signal receiving means is provided in the stationary section. Either of measured temperatures T and T1 or compensated temperature T2 is transmitted in a non-contact manner (not via a slip ring) from the rotary section to the stationary section, which provides the same effect as item (v) above. In place of the measured temperatures T1 and T2, a thermoelectric force generated when the measurement object contacts with the metallic wires and a thermoelectric force generated when the measurement object is not in contact with the metallic wires are sent (in a non-contact manner) as sending signals to the stationary section, where received sending signals may be used to compensate the temperature T2 of the measurement object on the basis of Equation 1.

(viii) Furthermore, application of a high frequency current to the stationary side coil causes electric power to be supplied in a non-contact manner to the rotary side coil provided so as to be opposed to the stationary side coil, causing no rotational resistance (friction) associated with the supply of electric power. Accordingly, lighter sliding between the metallic wires and the measurement object can be attained, which ensures the use of thinner metallic wires. This results in reduction in thermal capacity of metallic wires and minimization of frictional heat generation, wear and metallic powder generation, leading to further enhanced measurement accuracy and prolonged durability of the equipment.

DESCRIPTION OF THE PREFERRED EMBODIMENTS

[Embodiment 1]
Moving Object Thermometer

Figure 1:
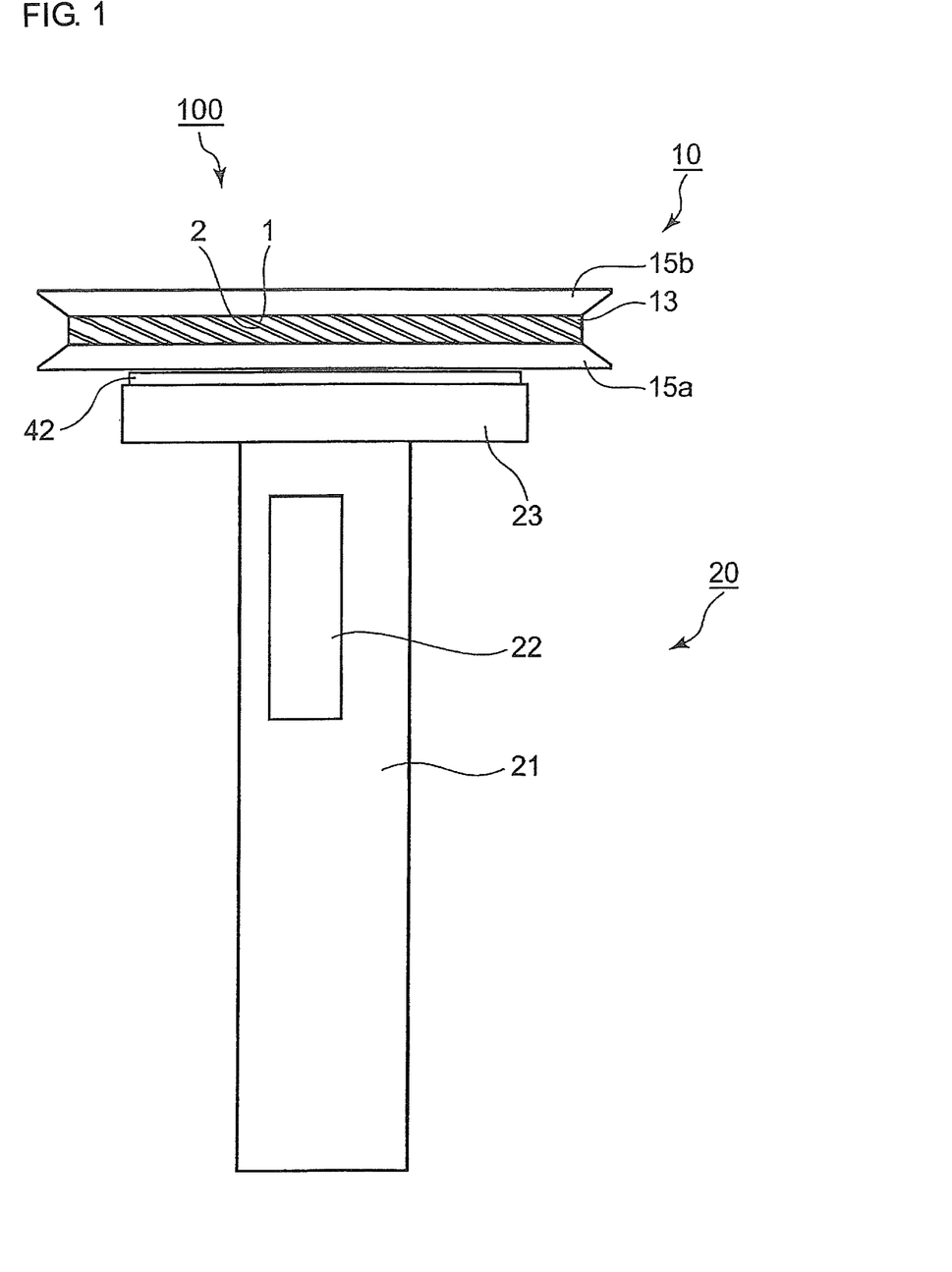
FIG. 1 is a front view showing an external appearance of a moving object thermometer according to Embodiment 1 of the present invention.
Figure 2:
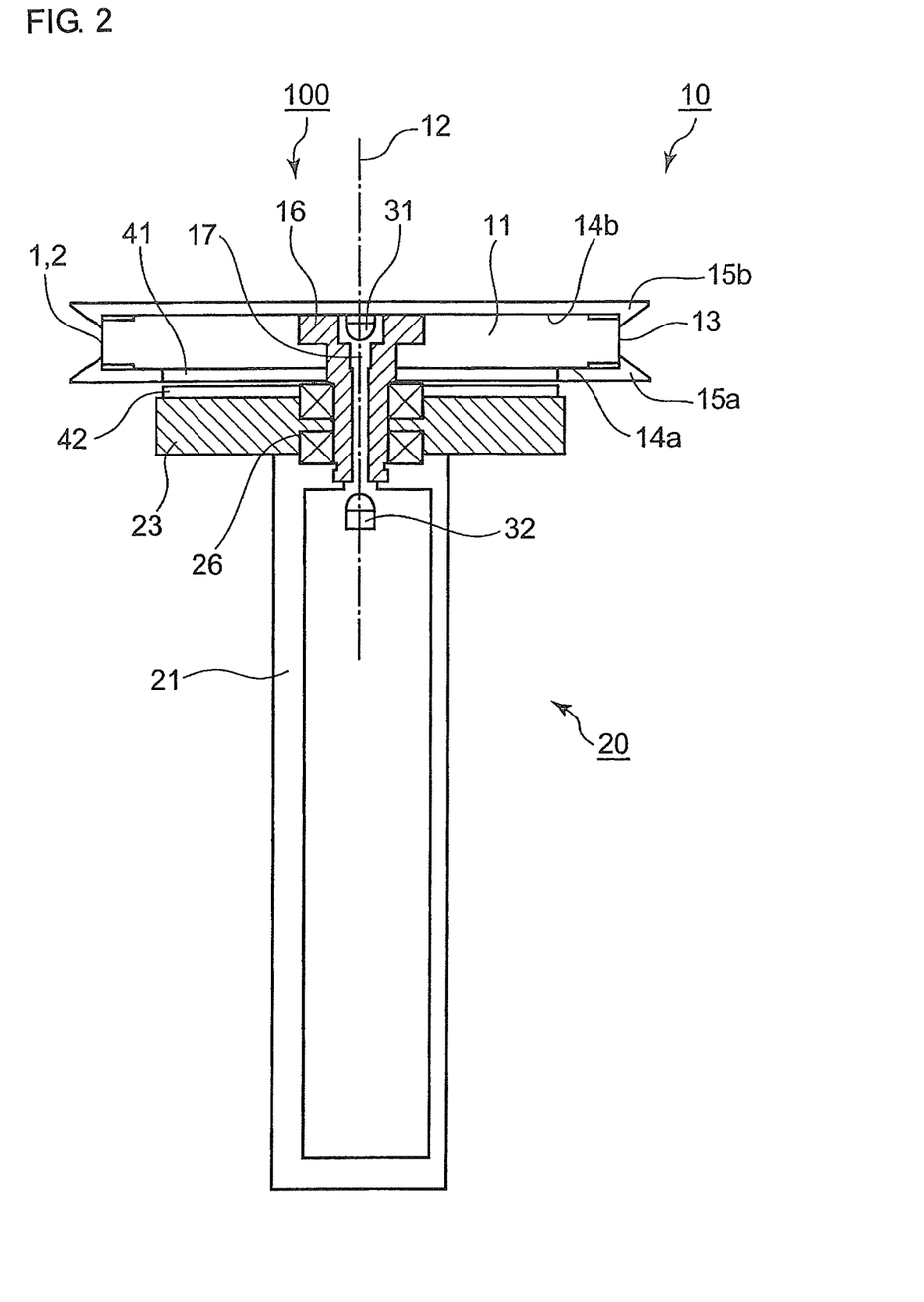
FIG. 2 is a cross-sectional view of the moving object thermometer shown in FIG. 1, when viewed from front.
Figure 3:
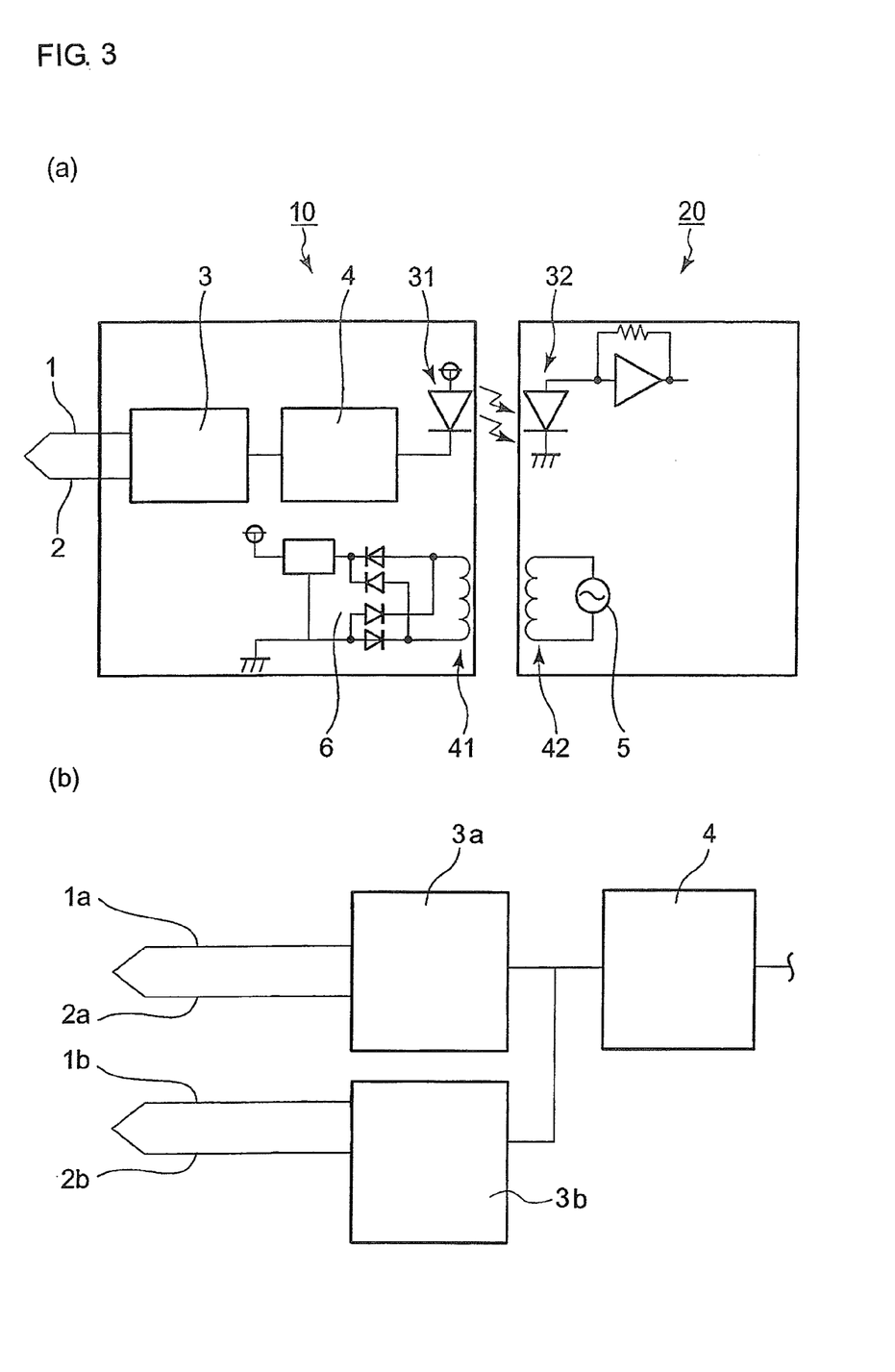
FIG. 3 is a circuit diagram showing an electrical configuration of the moving object thermometer shown in FIG. 1.
Figure 4:
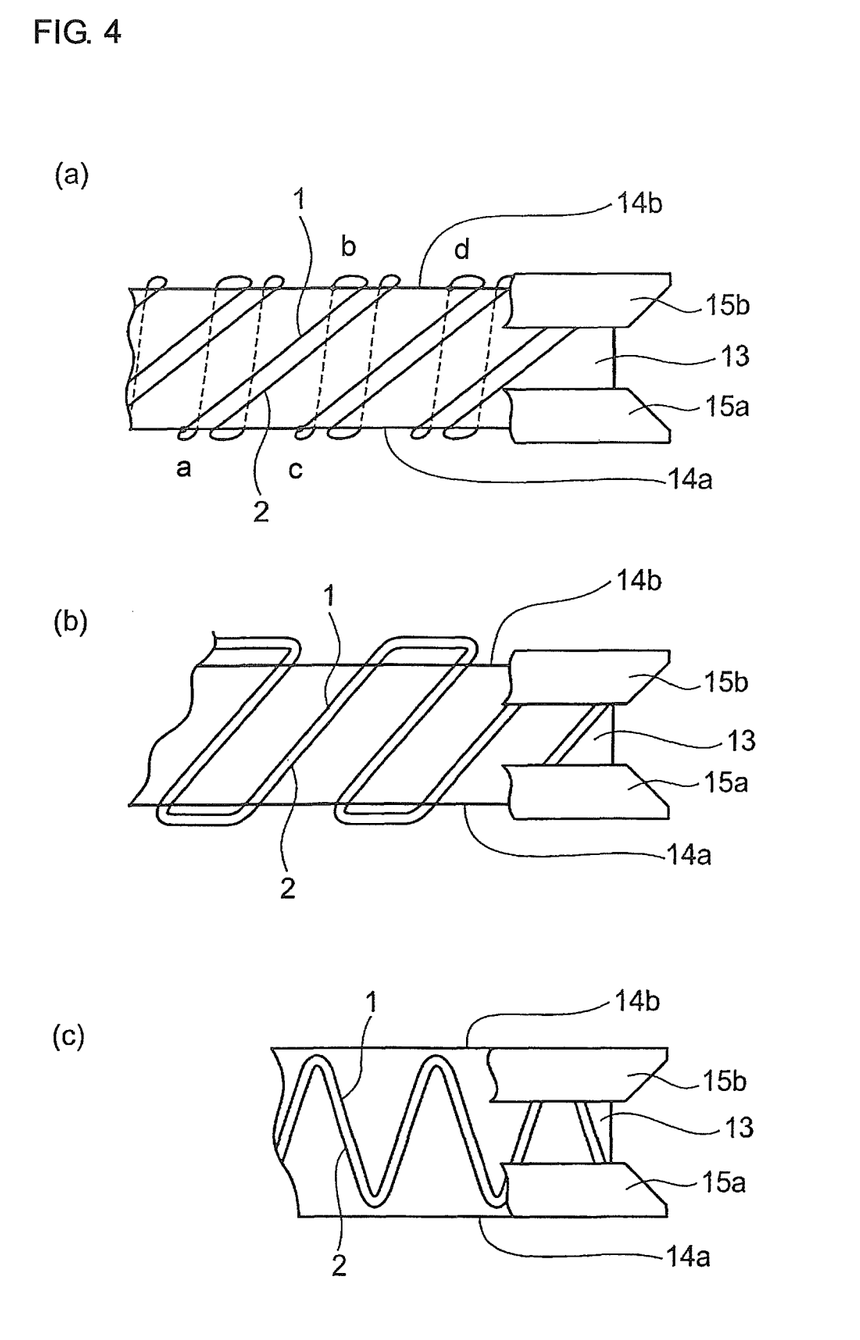
FIG. 4 is a partly cross-sectional front view showing part (placement of metallic wires) of the moving object thermometer shown in FIG. 1.

FIGS. 1 through 4 are views for explaining a moving object thermometer according to Embodiment 1 of the present invention. FIG. 1 is a front view illustrating the external appearance. FIG. 2 is a cross-sectional view when viewed from front. FIG. 3 is a circuit diagram showing the electrical configuration. FIG. 4 is a partly cross-sectional front view showing part (placement of metallic wires) of the moving object thermometer. These figures are schematically drawn views, and the present invention is not limited to the foregoing preferred embodiments. Various modifications are conceivable within the scope of the present invention. In FIGS. 1 and 2, a moving object thermometer 100 has a rotary section (same as a measuring section) 10 and a stationary section 20 that rotatably supports the rotary section 10.

(Rotary Section)

The rotary section 10 includes a disk 11 formed of an insulating material (synthetic resin) and a first metallic wire 1 (chromel thin wire) and a second metallic wire 2 (alumel thin wire) both of which constitute a thermocouple, wherein portions of the first metallic wire 1 and the second metallic wire 2 are disposed side by side on the outer circumferential surface 13 of the disk 11 so as to be inclined toward a shaft center 12 of the disk 11 (disposition to be detailed later). At this time, an end of the first metallic wire 1 is short-circuited with an end of the second metallic wire 2. Circular flanges 15a, 15b having a substantially triangle-shaped section are disposed at the outer circumferential surface 13 of the disk 11 along end faces 14a, 14b, and have a V-shaped pulley-like form having a flat bottom. In addition, a hollow rotary shaft 16 having a center hole 17 formed therein is provided on the shaft center 12, and a light emitting diode 31 (corresponding to signal sending means) is provided inside the rotary shaft 16. A rotary side coil 41 is provided at one end face 14a of the disk 11.

(Stationary Section)

The stationary section 20 has a stationary section body 21 having a temperature display 22 formed thereon, a stationary side coil 42, and a coil mounting section 23 having the stationary side coil 42 provided therein. A photodiode 32 (corresponding to signal receiving means) is provided on the stationary section body 21 so as to be opposed to an end face of the rotary shaft 16 supported by the bearing 26. At this time, the rotary side coil 41 provided on the rotary section 10 and the stationary side coil 42 provided on the stationary section 20 are opposed to each other so as to be spaced at a predetermined distance from each other. The light emitting diode 31 provided on the rotary section 10 and the photodiode 32 provided on the stationary section 20 are also opposed to each other at either end of the center hole 17.

(Circuit Configuration)

In FIG. 3, a cold junction compensation circuit (corresponding to a temperature measurement circuit) 3 connected to the first metallic wire 1 and the second metallic wire 2 and a voltage-frequency conversion circuit (corresponding to a signal sending circuit) 4 connected to the cold junction compensation circuit 3 are disposed inside the disk 11 of the rotary section 10, and the light emitting diode 31 is connected to the voltage-frequency conversion circuit 4. A rectifying circuit 6 connected to the rotary side coil 41 is also provided. On the other hand, the photodiode 32 is disposed in the stationary section 20, and a display control section (not illustrated) is connected to the photodiode 32, and the temperature display 22 is connected to the display control section. Also, the stationary side coil 42 connected to a high-frequency generating section (corresponding to a high-frequency generating circuit) 5 is disposed in the stationary section 20. In addition, the rotary side coil 41 is disposed so as to be spaced at a predetermined distance from the stationary side coil 42.

(Measuring Procedure)

When a high frequency (for example, 2 MHz) is applied to the stationary side coil 42, the rotary side coil 41 disposed in an electromagnetic field arising from such frequency application generates an induced electromotive force, which is rectified through the rectifying circuit 6, thereby causing electric power to be supplied to the rotary section 10 from the stationary section 20 in an non-contact manner. Subsequently, if the outer circumferential surface 13 of the disk 11 in the rotary section 10 is pressed against a moving measurement object (not illustrated), the measurement object contacts with the first metallic wire 1 and the second metallic wire 2 at the same time, which causes the first metallic wire 1 and the second metallic wire 2 to be short-circuited with each other, resulting in formation of a thermocouple. Then, a thermoelectric force generated in the thermocouple is measured by the temperature measurement circuit 3. At this time, the temperature T2 of the measurement object is compensated by using the following equation (hereinafter referred to as "Equation 1").

$$T2 = (T \cdot (\lambda 2 + \lambda 1) - T1 \cdot \lambda 1)/\lambda 2 \qquad \text{Equation 1}$$

T: Temperature measured by the temperature measurement circuit when the measurement object contacts with the metallic wires T1: Temperature measured by the temperature measurement circuit when the measurement object is not in contact with the metallic wires (that is, the ends of both metallic wires are short-circuited with each other)

$\lambda 1$: Average of thermal conductivities of the first metallic wire and the second metallic wire $\lambda 2$: Thermal conductivity of the measurement object Compensated temperature T2 of the measurement object is converted by the signal sending circuit 4 into a sending signal (equal to an electric signal), which is passed through the light emitting diode 31 to the photodiode 32 of the stationary section 20 in a non-contact manner and is displayed in the temperature display 22 as the surface temperature of the measurement object. Accordingly, even if the duration of contact between the metallic wire and the measurement object is short and they come out of contact with each other before the temperature of the metallic wire reaches the surface temperature of the measurement object, the surface temperature of the measurement object can be determined more precisely. Although the temperature measurement circuit 3 (rotary section 10) performs the compensation based on Equation 1 in the foregoing, the present invention is not limited to this. Temperatures T, T1 (or thermoelectric force values) measured by the rotary section 10 may be sent as sending signals to the stationary section 20 and be subjected to compensation based on Equation 1 in the stationary section 20.

As described above, the moving object thermometer 100 can measure the surface temperature of the narrowest (thinnest) measurement object (or that having the smallest conductor diameter). Since it is not necessary to make the distance between the first metallic wire 1 and the second metallic wire 2 smaller than the width of the measurement object (conductor diameter), no short-circuit failure will result regardless of the presence of metallic powder or the like. Also, since measurement can be made over a wide area of the outer circumferential surface 13 in the disk 11, a travelling measurement object can be easily guided with a simplified configuration. In addition, the more easily rotating disk 11 can be attained through an effort to reduce the weight and thermal capacity. This results in a lighter sliding contact among the first metallic wire 1, the second metallic wire 2, and the measurement object, minimizing frictional heat generation, wear, and metallic powder generation, which leads to enhanced measurement accuracy as well as improved durability of the equipment.

Furthermore, since the ends of the first metallic wire 1 and the second metallic wire 2 are short-circuited with each other, immunity from noises is ensured regardless of the presence of intermittent short-circuit events caused by the measurement object, which eliminates the possibility of deteriorated measurement accuracy. If noise reduction or cancellation is anticipated, the short-circuited ends of the metallic wires may be omitted. Although a chromel/alumel thermocouple is used in the foregoing, the present invention is not limited to this. For example, a platinum/rhodium thermocouple may be used.

In addition, a temperature measured in the rotary section 10 is converted into a sending signal (electric signal) and passed to the stationary section 20 in a non-contact manner, rather than being passed to the stationary section 20 without any modifications. Also, electric power is supplied from the stationary section 20 to the rotary section 10 in a non-contact manner, thereby allowing the rotary section 10 to achieve a minimum rotational resistance. This results in a lighter sliding contact among the first metallic wire 1, the second metallic wire 2, and the measurement object. Therefore, the heat capacity can be reduced through thinning of the first metallic wire 1 and the second metallic wire 2, or frictional heat generation, wear, and metallic powder generation can be minimized, which leads to further improvement in measurement accuracy and durability of the equipment. The present invention is not limited to an electric signal as a sending signal. Transmission by means of light, electromagnetic wave, magnetism, sound, electrostatic capacity or the like may be used. If it is used, the signal sending means 31 and the signal receiving means 32 will be accordingly changed. The present invention does not limit a non-contact supply means for electric power to the mentioned-above electromagnetic means. For example, the stationary section 20 may send light or sound wave emission (ultrasonic waves) to the rotary section 10 where conversion into electric power may be carried out.

(Placement of First Metallic Wire and Second Metallic Wire)

FIG. 4(a) schematically illustrates a placement of the first metallic wire 1 and the second metallic wire 2 shown in FIG. 1, where they are disposed so as to be inclined toward the shaft center and parallel to each other. In this case, the disk 11 has through-holes (indicated by dotted lines) formed at a plurality of locations thereof along the outer circumferential surface 13, the through-holes communicating one end face 14a with the other end face 14b. The first metallic wire 1 is disposed on the outer circumferential surface 13 in such a manner that its portion passes through a through-hole (indicated by dotted lines) to the end face 14a (indicated by "a" in the figure) to the end face 14b (indicated by "b" in the figure). In addition, it penetrates through another through-hole (indicated by dotted lines) from the end face 14b to the end face 14a (indicated by "c" in the figure). Likewise, the first metallic wire 1 is disposed on the outer circumferential surface 13 in such a manner that its portion goes toward the end face 14b (indicated by "d" in the figure). The portion of the first metallic wire 1 is disposed on the outer circumferential surface 13 in a zig-zag manner. Likewise, a portion of the second metallic wire 2 is also disposed on the outer circumferential surface 13 in a zig-zag manner.

Accordingly, if the through-holes are formed so as to be spaced at a predetermined distance from one another, the first metallic wire 1 and the second metallic wire 2 can be easily disposed at exact locations.

The disk 11 and the circular flanges 15a, 15b may be formed in an integral manner, and the through-holes in contact with the outer circumferential surface 13 may be formed in the circular flanges 15a, 15b, in addition to through-holes formed inside the outer circumferential surface 13 along the outer circumferential surface 13. In this case, both ends of the range ("a to b" or "c to d" range in FIG. 4(a)) provided in the outer circumferential surface 13 are restricted by the through-holes.

FIG. 4(b) schematically illustrates another placement of the first metallic wire 1 and the second metallic wire 2, where the first metallic wire 1 and the second metallic wire 2 are parallel to each other and they are folded substantially in the shape of "U" while contacting with the end face 14a and the end face 14b (folded portions of the first metallic wire 1 and the second metallic wire 2 drawn in FIG. 4(b) are intentionally made away from the end faces 14a, 14b for easy understanding). This eliminates the necessity for the formation of through-holes in the disk 11. The disk 11 and the circular flanges 15a, 15b may be formed in an integral manner, and the through-holes in contact with the outer circumferential surface 13 may be formed in the circular flanges 15a, 15b in such a manner that both ends of a range provided in the outer circumferential surface 13 are restricted by the through-holes.

FIG. 4(c) schematically illustrates further another placement of the first metallic wire 1 and the second metallic wire 2, where the first metallic wire 1 and the second metallic wire 2 are parallel to each other and they are folded substantially in the shape of "V" while contacting with the outer circumferential surface 13. In this case, since the folded portions are covered with the circular flanges 15a, 15b, the measurement object do not contact with the folded portions. This eliminates the necessity for the formation of through-holes in the disk 11, resulting in simplified folding of the first metallic wire 1 and the second metallic wire 2.

In the placements of the first metallic wire 1 and the second metallic wire 2 described above, the first metallic wire 1 and the second metallic wire 2, two wires in total, are disposed on and around the outer circumferential surface 13 in a zig-zag manner. The present invention, however, is not limited to this. For example, they may be disposed at one location across the outer circumferential surface 13 so as to be parallel to each other. In this case, measurement is made once every time the disk 11 makes one rotation. Also, a plurality of cold junction compensation circuits 3 may be provided, which are connected to the first metallic wire 1 and the second metallic wire 2, respectively. For example, as shown in FIG. 3(b), a cold junction compensation circuit 3a and a cold junction compensation circuit 3b are provided, in which the former is connected to the first metallic wire 1a and the second metallic wire 2a, and the latter is connected to the first metallic wire 1b and the second metallic wire 2b. Then, the first metallic wire 1a and the second metallic wire 2a are disposed in parallel on the outer circumferential surface 13 of the disk 11 so as to cross the outer circumferential surface 13, while the first metallic wire 1b and the second metallic wire 2b are disposed in parallel at the diagonal position. In this case, measurement is carried out twice every time the disk 11 makes one rotation. Even if one thermocouple becomes disconnected, the other thermocouple can make measurement uninterruptedly. Three or more cold junction compensation circuits 3 may be provided.

In addition, the first metallic wire 1a and the second metallic wire 2a may be disposed on one semicircle of the outer circumferential surface 13 in a zig-zag manner, and likewise the first metallic wire 1b and the second metallic wire 2b may be disposed on the other semicircle of the outer circumferential surface 13 in a zig-zag manner. In this case, measurement is carried out several times every time the disk 11 makes one rotation. Even if one thermocouple (for example, the first metallic wire 1a or the second metallic wire 2a) becomes disconnected, the other thermocouple can make measurement uninterruptedly. Three or more cold junction compensation circuits 3 may be provided.

Furthermore, since the present invention is not limited to measurement of surface temperature of a thin conductor wire, the surface temperature of a material having a larger width may be measured by removing the circular flanges 15a, 15b. Alternatively, the outer circumferential surface 13 of the disk 11 is pressed against a stationary (not travelling or rotating) measurement object, thereby causing the disk 11 to roll on the measurement object for measurement. In this case, surface temperatures at a plurality of locations and surface temperature distributions over a wider area can be easily measured.

Industrial Applicability

As described above, the present invention can be applied to a single-unit moving object thermometer that can precisely measure the surface temperature of traveling measurement objects of various forms (wires or materials with various diameters), or to a moving object thermometer mounted on various types of apparatuses (for example, an apparatus (injection molding apparatus) for continuously coating a preheated wire with a resin or the like) which are requested to precisely measure the surface temperature of a moving measurement object.

Description Of Numerals

1: first metallic wire, 2: second metallic wire, 3: cold junction compensation circuit (temperature measurement circuit), 4: voltage-frequency conversion circuit (signal sending circuit), 5: high frequency generating circuit (high frequency sending circuit), 6: rectifying circuit, 10: rotary section, 11: disk, 12: shaft center, 13: outer circumferential surface, 14a: end face, 14b: end face, 15a: circular flange, 15b: circular flange, 16: rotary shaft, 17: center hole, 20: stationary section, 21: stationary section body, 22: temperature display, 23: coil mounting section, 26: bearing, 31: light emitting diode (signal sending means), 32: photodiode (signal receiving means), 41: rotary side coil, 42: stationary side coil, 100: moving object thermometer

What is claimed is:

1. A moving object the mometer comprising:

a rotary section; and a stationary section that rotatably supports said rotary section, wherein said rotary section has a disk formed of an insulating material, and a first metallic wire and a second metallic wire both of which constitute a thermocouple; and wherein portions of said first metallic wire and said second metallic wire are disposed side by side on the outer circumferential surface of said disk so as to be inclined toward a shaft center of said disk.

2. The moving object thermometer of claim 1, wherein a portion of said first metallic wire is disposed in a zig-zag manner on the outer circumferential surface of said disk in such a manner that said portion runs from one end face to the other end face of said disk and at the same time runs from the other end face to the one end face; and wherein a portion of said second metallic wire is disposed in a zig-zag manner on the outer circumferential surface of said disk so as to run side by side with a portion of said first metallic wire.

3. The moving object thermometer of claim 1, wherein a plurality of through-holes communicating one end face with the other end face of the disk are provided along the outer circumferential surface of said disk;

wherein a portion of said first metallic wire is disposed on the outer circumferential surface of said disk so as to run from one end face to the other end face of said disk and at the same time run through said through-holes from the other end face to the one end face; and wherein a portion of the second metallic wire is disposed side by side with a portion of the first metallic wire on the outer circumferential surface of said disk so as to run from one end face to the other end face of said disk and at the same time run through said through-holes from the other end face to the one end face.

4. The moving object thermometer of claim 1, wherein an end of said first metallic wire and an end of said second metallic wire are short-circuited with each other.

5. The moving object thermometer of claim 1, wherein a temperature measurement circuit connected to said first metallic wire and said second metallic wire and a signal sending circuit connected to said temperature measurement circuit are mounted on the disk of said rotary section, and signal sending means connected to said signal sending circuit is mounted on the shaft center of said disk;

wherein signal receiving means is mounted on said stationary section so as to be opposed to and spaced at a predetermined distance from said signal sending means; and wherein, when a measurement object contacts with said first metallic wire and said second metallic wire, a thermoelectric force generated in said first metallic wire and said second metallic wire is measured by said temperature measurement circuit and said measured thermoelectric force is converted by said signal sending circuit into a sending signal, which is passed from said signal sending means to said signal receiving means.

6. The moving object thermometer of claim 4, wherein a temperature measurement circuit connected to said first metallic wire and said second metallic wire for measuring temperature on the basis of an thermoelectric force generated in said first metallic wire and said second metallic wire is mounted on the disk of said rotary section; and wherein, when T is a temperature measured by said temperature measurement circuit when a measurement object contacts with said first metallic wire and said second metallic wire and T1 is a temperature measured by said temperature measurement circuit when the measurement object is not in contact with said first metallic wire and said second metallic wire, temperature T2 of the measurement object is compensated by a following equation:

$$T2=(T\cdot(\lambda 2+\lambda 1)-T1\cdot\lambda 1)/\lambda 2,$$

where $\lambda 1$ is the average of thermal conductivities of said first metallic wire and said second metallic wire, and $\lambda 2$ is the thermal conductivity of the measurement object.

7. The moving object thermometer of claim 6, wherein signal sending means connected to said temperature measurement circuit is provided at the shaft center of the disk in said rotary section; and wherein signal receiving means is provided in said stationary section so as to be opposed to and spaced at a predetermined distance from said signal sending means, and said signal sending means sends either of said measured temperatures T and T1 or said compensated temperature T2 to said signal receiving means.

8. The moving object thermometer of claim 1, wherein a high frequency sending circuit and a stationary side coil connected to said high frequency sending circuit are provided in said stationary section;

wherein a rotary side coil is provided in said rotary section so as to be opposed to and spaced at a predetermined distance from said stationary side coil; and wherein application of a high frequency current to said stationary side coil causes electric power to be supplied to said rotary side coil in a non-contact manner.

* * * * *